Patented Dec. 26, 1944

2,366,128

UNITED STATES PATENT OFFICE 2,366,128

CHEWING GUM

Frank B. Root, Montclair, N. J., assignor to Ellis-Foster Company, a corporation of New Jersey No Drawing. Application August 1, 1942, Serial No. 453,149

6 Claims. (Cl. 99—135)

This invention relates to chewing gum and has for its object the provision of a novel synthetic chewing gum base which may be used in place of such naturally occurring rubbery products as chicle, jelutong, gutta siak, leche caspi, gutta kay, etc., or in place of chicle substitutes which generally consist of rubber-resin mixtures.

The natural rubber-like bases which are used in chewing gum have different physical properties and to attain a preferred degree of chewability, particularly in the case of the cheaper grades, they are often blended with one another. The bases must be washed and otherwise purified before use to free them from foreign material and improve the taste. To obtain a desired consistency they are often mixed with hard resins and the like such as coumarone resin, rosin ester and ethyl cellulose. A synthetic base can be controlled as to consistency and its supply does not depend upon native collection, long shipping and other unpredictable circumstances. Also, its quality is not liable to be lowered by adulteration with cheap gums before it reaches the manufacturer.

This invention depends upon the discovery that aliphatic polyamines can be condensed with the polycarboxylic acids obtained by heating an unsaturated higher fatty acid with an alpha-beta ethylene dicarboxylic acid such as maleic and that the reaction product is of firm rubbery consistency and capable of being chewed in the same way as chicle. The gum base is stable to oxidation and therefore a chewing gum (consisting of the base together with sweetening and flavoring agents) made therefrom does not harden and become brittle on aging. The base is cheap, light-colored and nonsticky; it dissolves essential oil flavoring materials so that the flavor persists during chewing of the gum. It is miscible with resins such as rosin ester, coumarone-indene, and the like, which can be used to vary the consistency. Also it can be blended with chicle, and the various guttas and rubbers, if desired; also with waxes and the like.

Unsaturated fatty acids to be used in the present invention include those from oils such as linseed, soya bean, peanut, cottonseed, tung, oiticica, sunflower seed, etc., and the pure or mixed acids therefrom such as linoleic, oleic, linolenic, eleostearic, licanic and the like. These acids are reacted with maleic acid or anhydride or any readily available equivalent thereof such as fumaric or citraconic acids. Equal moles of unsaturated fatty acid and maleic anhydride are suitable but with acids containing more than one double bond it is possible to increase the proportion of maleic. A crude mixture containing some saturated acids such as soya bean acids is advantageously reacted in the proportion of 1 mole of mixed acids to 1 mole of maleic anhydride, the saturated acids remaining unreacted but reacting in the polyamine treatment to plasticize the product. If desired, an acid catalyst such as toluenesulfonic acid can be used to accelerate the reaction and produce a polycarboxylic acid product of higher consistency. In any case, the reaction product is washed thoroughly with water to remove unreacted water-soluble substances and is then ready for combination with the polyamine.

Polyamines which are contemplated in the present reaction include the simple diamines such as ethylene and propylene diamine; also the condensed amines—diethylene triamine, triethylene tetramine, tetraethylene pentamine, etc. Other polyamines are tetramethylene diamine, hexamethylene diamine, piperazine and hydroxyethylethylene diamine. The preferred polyamines are the simple diamines containing amino group on adjoining carbon atoms, since these compounds are readily available and produce reaction products showing best chewing characteristics.

The proportion of aliphatic diamine reacted with the oil acid-maleic product can vary from about .3 to .4 mole of amine per carboxylic group although the proportion is preferably about .33 mole of diamine per carboxylic group; that is, .66 amine equivalent per acid equivalent. (Substantially the same relation seems to hold for other polyamines.) With these proportions the mixture can be reacted smoothly at temperatures up to about 200° C. and gelation occurs gradually after 2 hours or more. Long heating allows complete reaction and volatilization of oily impurities which might influence taste and consistency. If the amount of amine is substantially greater than the above specified the reaction product is liable to form an infusible gel before it becomes tasteless.

When the polycarboxylic acid and polyamine are mixed a homogeneous liquid is obtained and the temperature spontaneously rises due to salt formation. Continued heating is accompanied by foaming which results from water eliminated in conversion of the polyammonium salt to a polyamide or polyamide-imide. Finally, foaming subsides and the mass gradually thickens. In order to get the best chewing properties it is preferred to stop the heating at a point which is short of gelation. Throughout the heating the reaction product is very stringy and at the end point for the products herein described it may be drawn into fine threads many feet in length and which are only slightly tacky.

The preparation of polycarboxylic acids from the reaction of an unsaturated higher fatty acid and a maleic type acid is illustrated by the following:

A. *Soya bean acids—Maleic adduct.*—Two hundred eighty parts of soya bean fatty acids and 98 parts of maleic anhydride were heated under reflux at 200°–205° C. for about 2.5 hours. After thorough washing with hot water and heating to 120° C. to dehydrate, the product had an acid number of 334 and when cold was a light yellow, semi-solid mass. Theoretically, the reaction product is a tribasic acid (or a carboxyacid anhydride); however, it is noted that during reaction some $CO_2$ is evolved (possibly by decarboxylation) so that the product is probably a mixture of di- and tricarboxylic acids. The acid number indicates this.

B. *Linseed acids—maleic adduct.*—Two hundred eighty parts of linseed oil acids and 98 parts of maleic anhydride were heated under reflux at 200°–205° C. for 2 hours. The product was a light-yellow semisolid; acid number 338.

C. *Peanut oil acids—maleic adduct.*—Two hundred eighty parts peanut fatty acids and 98 parts maleic anhydride were reacted as in the case of soya bean acids and linseed acids. Acid number 290.

D. *Soya bean acids—maleic adduct.*—Two hundred eighty parts of fatty acids were reacted with 148 parts of maleic anhydride. Acid number 261. (This differs from product A in using a higher proportion of maleic anhydride.)

The following are examples of chewing gum materials made from unsaturated higher fatty acid-maleic adducts and polyamines. Many variations are possible and it is therefore not intended that these illustrative examples are limiting.

*Example 1.*—Twenty-five parts of soya bean acids-maleic adduct (A) and 4.5 parts of ethylene diamine (70% aqueous solution) were heated for 2 hours at 130–135° C. There was then added a further amount of 75 parts soya bean acids-maleic adduct and 13.5 parts diamine solution and heating was continued at 135°–140° C. for 4.5 hours. The product was a light-brown, pliable, tasteless mass.

A chewing gum was made from this base according to the following formula:

| | Per cent |
|---|---|
| Corn syrup | 25.00 |
| Sugar | 58.00 |
| Gum base | 16.25 |
| Peppermint oil | 0.75 |

The sugar and syrup were cooked slowly until smooth. The base was then added and stirred until the mixture was homogeneous, after which it was allowed to cool somewhat and the flavoring added. When partially solidified the mass was dumped upon a surface, dusted with powdered sugar, rolled into a thin sheet and finally cut into conventional-sized sticks of chewing gum. The gum when chewed was very smooth and of about the consistency of purified chicle.

*Example 2.*—One hundred parts of soya bean acids-maleic adduct (A) and 16.5 parts of ethylene diamine (70% aqueous solution) were heated gradually to 180° C. for 4 hours. The product was a soft, somewhat rubbery, tasteless mass which was fused with 10% of paraffin wax to form a firm chewable mass.

Incorporation of waxes gives a smoother texture to the base when it is chewed. Other waxes may be used such as carnauba, ouricury, ceresin, candelilla and beeswax, all of which are miscible with the base.

*Example 3.*—Five hundred parts of soya bean acids-maleic adduct (A) and 90 parts of ethylene diamine (70% aqueous solution) were heated gradually to 175° C. for 3 hours during which time there was a loss in weight of 95 parts, representing water from the diamine solution and from the condensation reaction. There were then added 33 parts of paraffin wax and 132 parts of Neville R–7 resin (a purified polycoumarone resin), and heating was continued for 4 hours at 160°–170° C. The reaction mixture was poured into a shallow pan to cool and formed a slightly opaque, light brown mass. Made into chewing gum it showed excellent plasticity when chewed.

In place of polycoumarone resin as used in this example, other resins may be used. Those readily miscible include ester gum, rosin, hydrogenated and polymerized rosin and esters thereof, polyhydric alcohol esters of rosin-maleic adducts, polymerized pinene such as the resins sold under the names of Nypene and Piccolyte, etc. Selection of resin to be added depends upon their taste characteristics and certain resins must be carefully purified. A small amount of ethyl cellulose may be added if a harder gum is desired.

*Example 4.*—Five per cent of finely divided bentonite was added to the gum base of Example 1. When made into chewing gum the mineral filler increased the consistency slightly and give a more velvety feel on chewing. Other fillers may be used such as powdered chalk or barytes. Mineral fillers are particularly advantageous in wax-containing products such as those of Examples 2 and 3 since they tend to eliminate the somewhat greasy sensation to the tongue produced by the waxes.

*Example 5.*—Fifty parts of soya bean acids-maleic adduct (A), 6.8 parts of ethylene diamine (70% aqueous solution) and 2.8 parts of propylene diamine were heated to 155° C. for about 3 hours. To 50 parts of this product there were added 3.3 parts of mineral oil (purified oil such as is sold under the names of Nujol or Primol) and 13.3 parts of Neville R–8 resin (polycoumarone). The product was a soft somewhat rubbery mass which when made into gum became quite soft when chewed.

Besides the mineral oil as used above other water-insoluble liquids may be used in the products of this invention as softeners; for example, dibutyl phthalate, diamyl phthalate or dibutyl sebacate.

*Example 6.*—One hundred parts of peanut oil acids-maleic adduct (C) and 20 parts of ethylene diamine (70% aqueous solution) were heated for 3 hours at 150°–160° C. until foaming had largely subsided. The product was a brown, flexible mass which formed a soft chewing gum when mixed with sweetening and flavoring material.

The chewing gum bases of this invention are tasteless and do not undergo any hydrolysis in the mouth on long chewing. Their stability may also be shown as follows: 25 g. of the base of Example 3 was heated with 100 cc. of water under reflux. The pH of the water was 5.8. After refluxing for 1 hour it was still 5.8 and after 3 hours it was 5.4—and tasteless. The water poured from the base and evaporated to dryness left only a trace of oily residue. The same stability was shown when the base was refluxed with a dilute salt solution to simulate saliva.

I claim:

1. Chewing gum material comprising the condensation product of an aliphatic polyamine with the polycarboxylic acid obtained by heating an unsaturated higher fatty acid and an alpha-beta ethylene dicarboxylic acid.

2. Chewing gum material comprising the condensation product of an aliphatic polyamine with the polycarboxylic acid obtained by heating an unsaturated higher fatty acid and maleic anhydride.

3. Chewing gum material comprising the condensation product of from .3 to .4 mole of an aliphatic polyamine per carboxyl group of the polycarboxylic acid obtained by heating substantially 1 mole of an unsaturated higher fatty acid with 1 mole of maleic anhydride.

4. Chewing gum material comprising the condensation product of ethylene diamine with the polycarboxylic acid obtained by heating an unsaturated higher fatty acid and maleic anhydride.

5. Chewing gum material comprising the condensation product of propylene diamine with the polycarboxylic acid obtained by heating an unsaturated higher fatty acid and maleic anhydride.

6. Chewing gum material comprising the condensation product of ethylene diamine and the polycarboxylic acid obtained by heating soya bean oil fatty acid with maleic anhydride.

FRANK B. ROOT.